United States Patent [19]
Hayes

[11] 3,887,492
[45] *June 3, 1975

[54] PREPARATION OF AMORPHOUS ALUMINA SPHERES

[75] Inventor: John C. Hayes, Palatine, Ill.

[73] Assignee: Universal Oil Products Company, Des Plaines, Ill.

[ * ] Notice: The portion of the term of this patent subsequent to Apr. 7, 1992, has been disclaimed.

[22] Filed: July 16, 1973

[21] Appl. No.: 379,680

[52] U.S. Cl.................................. 252/448; 252/477
[51] Int. Cl............................................. B01j 11/44
[58] Field of Search..................................... 252/448

[56] References Cited
UNITED STATES PATENTS

| | | | |
|---|---|---|---|
| 2,620,314 | 12/1952 | Hoekstra............................. | 252/448 |
| 2,666,749 | 1/1954 | Hoekstra............................. | 252/448 |
| 2,689,226 | 9/1954 | Hoekstra.......................... | 252/448 X |
| 2,703,315 | 3/1955 | Murray et al........................ | 252/448 |
| 2,774,743 | 12/1956 | Hoekstra............................. | 252/448 |
| 2,865,866 | 12/1958 | Hoekstra............................. | 252/448 |
| 3,027,234 | 3/1962 | Michalko........................ | 252/448 X |
| 3,096,295 | 7/1963 | Michalko............................. | 252/448 |
| 3,600,129 | 8/1971 | Uesely................................ | 252/448 |
| 3,714,071 | 1/1973 | Michalko............................. | 252/448 |

Primary Examiner—Helen M. S. Sneed
Attorney, Agent, or Firm—James R. Hoatson, Jr.; Robert W. Welch; William H. Page, II

[57] ABSTRACT

A method of preparing amorphous alumina spheres. An acidic alumina hydrosol is commingled with a neutralizing or gelling agent and dispersed as droplets in a hot oil suspending media to form firm, spherical, hydrogel particles. The particles are transferred after forming to an aqueous salt solution with a pH of at least about 5.5, and with a salt concentration substantially equivalent to that of the aqueous phase of the hydrogel particles. The salt concentration of the aqueous solution is reduced gradually until the solution is salt-free. Amorphous alumina spheres are recovered upon drying.

8 Claims, No Drawings

PREPARATION OF AMORPHOUS ALUMINA SPHERES

This invention relates to the manufacture of spheroidal amorphous alumina particles. Spheroidal alumina particles offer a number of advantages when employed as an adsorbent, or as a catalyst, or as a catalyst support, particularly for hydrocarbon conversion reactions. When employed in a fixed bed in a reaction or contact zone, the spheroidal particles permit a more uniform packing of the bed thereby reducing variations in pressure drop across the bed, and reducing the tendency of a reactant stream to channel through the bed whereby a portion of the catalyst or adsorbent is bypassed. When employed in a moving bed type of operation, e.g., wherein the particles gravitate through a reaction zone, or are transported from one zone into another by the reactants or an extraneous carrying medium, the spheroidal particles have a further advantage in that there are no sharp edges to break or wear off during processing thus creating the tendency to plug process equipment.

Spheroidal alumina particles are conveniently and advantageously manufactured by the well-known oil-drop method described by Hoekstra in U.S. Pat. No. 2,620,314. Briefly, the method comprises commingling an alumina sol and a gelling agent at below gelation temperature and dispersing the mixture as droplets in a water immiscible suspending media, usually a gas oil, maintained at an elevated temperature whereby the hydrosol droplets are formed into firm, spherical, hydrogel particles.

It has been the practice to retain and age the hydrogel spheres in the oil suspending media for an extended period, and thereafter in an aqueous alkaline media for a further extended period. The oil aging process has heretofore been considered as essential to obviate excessive cracking and sphere disintegration during the subsequent aqueous phase treatments. However, the practice also promotes the formation of crystalline boehmite alumina which, upon calcination at 370°–650° C., is converted substantially to gamma-alumina.

It is an object of this invention to present a novel oil-drop method for the manufacture of spheroidal amorphous alumina particles. Thus, in one of its broad aspects, the present invention embodies a method of preparing amorphous alumina spheres which comprises commingling an ammonia precursor and an acidic alumina hydrosol at below gelation temperature, said ammonia precursor being decomposable to ammonia with increasing temperature; dispersing the mixture as droplets in a hot oil bath effecting decomposition of said ammonia precursor and formation of hydrogel spheres therein; separating and immersing the hydrogel particles in an aqueous salt solution having a pH of at least about 5.5, and a salt concentration substantially equivalent to the salt concentration of the internal aqueous phase of said hydrogel particles; maintaining said particles in contact with said solution while reducing the salt concentration gradually at conditions to minimize the concentration gradient between said solution and the internal aqueous phase of said particles until said solution is substantially salt-free; separating, and drying and calcining the resulting salt-free hydrogel particles to form amorphous, high surface area alumina spheres.

Other objects and embodiments of this invention will become apparent in the following detailed specification.

The acidic alumina hydrosols herein contemplated include such as are prepared by the hydrolysis of a suitable acid salt of aluminum, for example aluminum chloride, and reduction of the acid anion concentration of the solution, for example, the chloride anion concentration thereof. Reduction of the acid anion concentration can be accomplished by subjecting an aluminum salt solution to electrolysis utilizing an electrolytic cell with a porous partition between the anode and cathode. In this manner, an acid anion deficiency is created in the cathode compartment whereby an olation reaction is promoted with the formation of inorganic polymers of colloidal dimension dispersed and suspended in the remaining liquid. In some cases, as in the case of aluminum acetate, where the acid anion is sufficiently volatile, the reduction in acid anion concentration can be effected simply by heating. A particularly suitable method is in the use of aluminum metal as a neutralizing agent in conjunction with, for example, an aqueous aluminum chloride solution. In this instance, the salt of neutralization is itself a hydrolyzable aluminum salt subject to polymerization and ultimate sol formation.

An aluminum chloride hydrosol, variously referred to as an aluminum oxychloride hydrosol, aluminum hydroxychloride hydrosol, and the like, is a preferred acidic alumina hydrosol for use in the method of this invention. A particularly desirable aluminum chloride hydrosol is prepared by digesting aluminum metal in hydrochloric acid at about reflux temperature — usually a temperature of from about 80° to about 105° C., and reducing the chloride anion concentration of the resulting aluminum chloride solution by the device of maintaining an excess of aluminum reactant in contact with the reaction mixture as a neutralizing agent until a hydrosol containing aluminum and chloride anion in a ratio of from about 0.9:1 to about 1.5:1 is formed. The hydrosol is preferably prepared to contain less than about 14 wt. % aluminum, generally from about 12 to about 14 wt. %.

In accordance with the oil drop method, the acidic alumina hydrosol is commingled with an ammonia precursor at below gelation temperature, suitably at a temperature of from about 25° to about 45° C., the ammonia precursor being decomposable or hydrolyzable to ammonia with increasing temperature. Thus, as the mixture is dispersed as droplets in a hot oil bath, ammonia is evolved and acts as a neutralizing or setting agent, and an ammonium salt of neutralization is formed in the aqueous phase of the resulting spheroidal hydrogel particles. The ammonia precursor is most often hexamethylenetetramine, or urea, or mixtures thereof, although other weakly basic materials which are substantially stable at normal temperatures but decomposable or hydrolyzable to ammonia with increasing temperature may be employed. The acidic alumina hydrosol is commingled with a sufficient amount of hexamethylenetetramine, or other ammonia precursor, to effect at least complete neutralization of the acid anion contained in said hydrosol upon total decomposition or hydrolysis to ammonia. For example an aluminum chloride hydrosol is typically commingled with sufficient quantity of a 28-40 wt. % aqueous hexamethylenetetramine solution to provide a mixture containing hexamethylenetetramine and chloride anion in a molar ratio of about 1:2.

The mixture is formed into spheroidal hydrogel particles on being dispersed as droplets in a hot oil bath at a temperature effecting decomposition of the ammonia precursor — usually a temperature of from about 50° to about 105° C. The oil is typically a light gas oil chosen principally for its high interfacial tension with respect to water. Passage of the droplets through the oil bath produces two effects. First, as each droplet penetrates the oil surface, it draws into a spherical shape. The droplets are principally water at this stage and, being insoluble in the oil suspending media, they tend to draw into a shape resulting in the least surface area for their volume. The second effect is that the formed spheres are given time to gel in the presence of the decomposing ammonia precursor and convert to firm hydrogel particles as they gravitate to the bottom of the oil suspending media.

As previously mentioned, it has been the practice to retain the hydrogel spheres in the oil suspending media for an extended period, and thereafter in an aqueous alkaline media for a further extended period, the oil aging process being considered as essential to obviate extensive cracking and sphere disintegration during the subsequent aqueous treatments. It has now been determined that the cracking and sphere disintegration heretofore observed is caused by osmotic swelling of the hydrogel spheres — the result of the salt concentration gradient between the aqueous phase of the hydrogel spheres and the external aqueous phase. In accordance with the present invention, the hydrogel spheres are separated and immersed in an aqueous salt solution having a pH of at least about 5.5 and a salt concentration substantially equivalent to the salt concentration of the internal aqueous phase of the hydrogel spheres. Generally, the salt concentration will be in the range of from about 0.5 to about 10 molar. In any case, the required salt concentration is readily determined by analysis of the syneresis liquor which exudes from the hydrogel spheres during the gelation process and collects at the bottom of the oil bath. The salt contained in the internal aqueous phase of the hydrogel spheres will invariably be an ammonium salt resulting from neutralization of the acid anion contained therein — e.g., chloride, and the aqueous salt solution is preferably, although not necessarily, an aqueous ammonium chloride solution.

Pursuant to the present invention, the hydrogel spheres are maintained in contact with the salt solution while reducing the salt concentration gradually so as to minimize the concentration gradient between said solution and the internal aqueous phase of the hydrogel spheres until the solution is substantially salt-free. For example, a volume of hydrogel spheres is immersed in a substantially equal volume of the aqueous salt solution in a vertical contact column at a temperature of from about 25° to about 60° C. The aqueous solution is then processed upwardly in contact with the hydrogel spheres, the overhead effluent being continuously recycled to said contact column. The pH of at least about 5.5 is maintained by the addition of ammonia or ammonium hydroxide to the recycle stream, and the salt concentration is gradually reduced by the addition of deionized water to the recycle stream until the solution is substantially salt-free. The contact column is provided with an overflow to maintain a substantially constant volume therein as the wash water is being diluted.

The hydrogel spheres, after the final salt-free waterwash, are suitably dried at a temperature of from about 95° to about 315° C. over a period of from about 0.5 to about 5 hours or more. Sphere shrinkage with attendent cracking, commonly experienced during the drying process, is minimized by including a surfactant in the final wash water prior to drying. Non-ionic surfactants such as the polyoxyethylene alkylphenols, polyoxyethylene alcohols, polyoxyethylene esters of fatty acids, polyoxyethylene mercaptans, polyoxyethylene alkylamines, polyoxethylene alkylamides, and the like, are to be preferred. In any case, the dried amorphous alumina spheres may be calcined, preferably in an oxidizing atmosphere such as air, at a temperature of from about 425° C. to about 750° C. prior to use.

The following example is presented in illustration of the method of this invention and is not intended as an undue limitation on the generally broad scope of the invention as set out in the appended claims.

EXAMPLE I

An acidic alumina hydrosol was prepared by digesting aluminum in dilute hydrochloric acid at about 102° C. to yield a hydrosol with a specific gravity of about 1.345, and containing aluminum in about a 1.15:1 weight ratio with the chloride anion content thereof. The hydrosol was cooled to about 6° C. and admixed with an equal volume of a 28% aqueous hexamethylenetetramine solution. The mixture was dispersed as droplets in a gas oil suspending media contained in a dropping tower to about 95° C. The syneresis liquor, which exuded from the droplets as they formed to hydrogel spheres and collected at the bottom of the forming tower, had a pH of 5.8 and an ammonium chloride concentration of about 1.2 molar. Within about 30 minutes, about a 1.5 liter volume of the spheres was transferred from the forming tower to a vertical contact column containing about 2 liters of 1.2 molar aqueous ammonium chloride solution at a pH of 5.8. The aqueous solution was processed upwardly through the contact column at room temperature and recycled at a rate of about 1 liter per minute. Fresh ammoniated water with a pH of 7.5 was added to the recycle stream at the rate of approximately 100 cubic centimeters per hour, and the resulting excess solution discharged from the contact column by means of a weir provided to maintain a substantially constant volume therein. After about 100 hours, the ammonium chloride concentration had been reduced to about 0.002 molar. The spheres were removed from the column, detergent-rinsed, and air-dried. X-ray analysis indicated the spheres to be essentially 100% amorphous alumina. The spheres were then further oven-dried at about 220° C. and calcined in air at 500°–600° C. The resulting amorphous alumina spheres were perfectly clear and transparent, and had a surface area of about 330 square meters per gram.

I claim as my invention:

1. A method of preparing amorphous, high surface area alumina spheres, which comprises:
   a. commingling an ammonia precursor and an acidic alumina hydrosol at below gelation temperature, said ammonia precursor being decomposable to ammonia with increasing temperature;

b. dispersing the mixture as droplets in a hot oil bath effecting decomposition of said ammonia precursor and formation of hydrogel spheres therein;
c. separating and immersing the hydrogel particles in an aqueous ammonium chloride salt solution having a pH of at least about 5.5, and having a salt concentration substantially equivalent to the salt concentration of the internal aqueous phase of said hydrogel particles;
d. maintaining said particles in contact with said solution while reducing the salt concentration gradually at conditions to minimize the concentration gradient between said solution and the internal aqueous phase of said particles, until said solution is substantially salt-free;
e. separating, and drying and calcining the resulting salt-free hydrogel particles.

2. The method of claim 1 further characterized with respect to step (a) in that said ammonia precursor is hexamethylenetetramine.

3. The method of claim 1 further characterized with respect to step (a) in that said ammonia precursor is utilized in an amount to effect substantially complete neutralization of the acid anion contained in said mixture.

4. The method of claim 1 further characterized with respect to step (a) in that said hydrosol is an aluminum chloride hydrosol containing aluminum in from about a 0.9 to about 1.5 weight ratio with the chloride anion content thereof, and said ammonia precursor is hexamethylenetetramine utilized in from about a 1:2.5 to about 1:1.5 mole ratio with the chloride anion concentration of said mixture.

5. The method of claim 1 further characterized with respect to step (b) in that said oil bath is maintained at a temperature of from about 50° to about 105° C.

6. The method of claim 1 further characterized with respect to step (c) in that said aqueous salt solution is from about a 0.5 to about a 10 molar ammonium chloride solution.

7. The method of claim 1 further characterized with respect to step (c) and with respect to step (d) in that said hydrogel particles are washed with said aqueous salt solution at a temperature of from about 25° to about 60° C.

8. The method of claim 1 further characterized with respect to step (e) in that said hydrogel particles are dried and calcined at a temperature of from about 425° to about 750° C.

* * * * *

UNITED STATES PATENT AND TRADEMARK OFFICE
CERTIFICATE OF CORRECTION

PATENT NO. : 3,887,492

DATED : June 3, 1975

INVENTOR(S) : John C. Hayes

It is certified that error appears in the above-identified patent and that said Letters Patent are hereby corrected as shown below:

On the cover page, lefthand column, delete

"[ * ] Notice   The portion of the term
of this patent subsequent
to Apr. 7, 1992, has
been disclaimed."

Signed and Sealed this

Twenty-fifth Day of May 1982

[SEAL]

Attest:

GERALD J. MOSSINGHOFF

Attesting Officer   Commissioner of Patents and Trademarks